United States Patent
Subramanian et al.

(10) Patent No.: US 12,417,412 B2
(45) Date of Patent: Sep. 16, 2025

(54) AUTOMATED MODEL PREDICTIVE CONTROL USING A REGRESSION-OPTIMIZATION FRAMEWORK FOR SEQUENTIAL DECISION MAKING

(71) Applicant: International Business Machines Corporation, Armonk, NY (US)

(72) Inventors: Dharmashankar Subramanian, White Plains, NY (US); Nianjun Zhou, Chappaqua, NY (US); Pavankumar Murali, Ardsley, NY (US)

(73) Assignee: International Business Machines Corporation, Armonk, NY (US)

( * ) Notice: Subject to any disclaimer, the term of this patent is extended or adjusted under 35 U.S.C. 154(b) by 885 days.

(21) Appl. No.: 17/651,293

(22) Filed: Feb. 16, 2022

(65) Prior Publication Data
US 2023/0259830 A1    Aug. 17, 2023

(51) Int. Cl.
*G06N 20/20*      (2019.01)
*G05B 13/04*    (2006.01)
(Continued)

(52) U.S. Cl.
CPC .............. *G06N 20/20* (2019.01); *G05B 17/02* (2013.01); *G06F 18/21322* (2023.01);
(Continued)

(58) Field of Classification Search
CPC ........ G06N 20/00; G06N 20/10; G06N 20/20; G06N 3/04; G06N 3/048; G06N 3/0499;
(Continued)

(56) References Cited

U.S. PATENT DOCUMENTS 8,285,581 B2    10/2012    Abe
8,958,922 B2     2/2015    Blank
(Continued)

FOREIGN PATENT DOCUMENTS

CN    112529186 B    6/2021
WO    2016061283 A1    4/2016
(Continued)

OTHER PUBLICATIONS

Danishvar, et al., "Coarse Return Prediction in a Cement Industry's Closed Grinding Circuit System through a Fully Connected Deep Neural Network (FCDNN) Model", Applied Sciences, 2021, 15 pages.
(Continued)

*Primary Examiner* — Shane D Woolwine
(74) *Attorney, Agent, or Firm* — CANTOR COLBURN LLP; Robert Bean

(57) ABSTRACT

A computer-implemented method, computer program product, and computer system for automated model predictive control. The computer system trains multiple step look-ahead regression models, using historical states and historical actions for a to-be-optimized system, for each timestep of a past time horizon. Regression models may be either linear or nonlinear in order to capture process dynamics and nonlinearity. The computer system generates optimization constraints for each timestep of a future time horizon. The computer system generates optimization variables, based on the multiple step look-ahead regression models, for each timestep of the future time horizon. The computer system constructs a mixed integer linear programming based optimization model that includes an objective function, the optimization constraints, and the optimization variables. Nonlinear regression models are converted into piecewise linear approximation functions. The computer system solves
(Continued)

the optimization model to produce actions for the to-be-optimized system, over the future time horizon, and recommend commitment-look-ahead actions.

20 Claims, 7 Drawing Sheets

(51) Int. Cl.
G05B 17/02 (2006.01)
G06F 18/21 (2023.01)
G06F 18/2132 (2023.01)
G06N 3/0499 (2023.01)
G06N 3/09 (2023.01)
G06N 5/01 (2023.01)

(52) U.S. Cl.
CPC ......... G06F 18/217 (2023.01); G06N 3/0499 (2023.01); G06N 3/09 (2023.01); G06N 5/01 (2023.01); *G05B 13/048* (2013.01); *G06F 18/21326* (2023.01)

(58) Field of Classification Search
CPC ............ G06N 3/08; G06N 3/09; G06N 3/091; G06N 3/092; G06N 3/096; G06N 3/0985; G06N 5/01; G06N 3/12; G06N 3/123; G05B 17/02; G05B 13/048; G06F 18/21322; G06F 18/217; G06F 18/21326
See application file for complete search history.

(56) References Cited

U.S. PATENT DOCUMENTS

| | | | |
|---|---|---|---|
| 10,901,105 B2 | 1/2021 | Halsey | |
| 11,615,293 B2 | 3/2023 | Theocharous et al. | |
| 2009/0125155 A1 | 5/2009 | Hill | |
| 2009/0177612 A1 | 7/2009 | Gorham | |
| 2015/0317576 A1 | 11/2015 | Bonner | |
| 2017/0024643 A1 | 1/2017 | Lillicrap | |
| 2019/0107825 A1* | 4/2019 | Wenzel | G06Q 10/04 |
| 2019/0236458 A1 | 8/2019 | Taylor et al. | |
| 2019/0251487 A1 | 8/2019 | Srivastava | |
| 2019/0288918 A1* | 9/2019 | Baughman | H04L 41/16 |
| 2019/0386890 A1* | 12/2019 | Baughman | H04L 41/145 |
| 2021/0012190 A1 | 1/2021 | Murali | |
| 2021/0232626 A1 | 7/2021 | Santry | |
| 2022/0083842 A1 | 3/2022 | Achar et al. | |
| 2022/0121921 A1 | 4/2022 | Chen et al. | |
| 2022/0146997 A1 | 5/2022 | Stepanova et al. | |
| 2023/0041035 A1 | 2/2023 | Harsha et al. | |
| 2025/0123606 A1 | 4/2025 | Subramanian et al. | |

FOREIGN PATENT DOCUMENTS

| | | |
|---|---|---|
| WO | 2018004464 A1 | 1/2018 |
| WO | 2019149949 A1 | 8/2019 |

OTHER PUBLICATIONS

Franke et al., "Sample-Efficient Automated Deep Reinforcement Learning", Published as a conference paper at ICLR 2021, arXiv:2009.01555v3 [cs.LG] Mar. 17, 2021, 23 pages.

Lee et al., "Batch Reinforcement Learning with Hyperparameter Gradients", Proceedings of the 37th International Conference on MachineLearning, Online, PMLR 119, 2020, 11 pages.

Mell et al., "The NIST Definition of Cloud Computing", NIST National Institute of Standards and Technology U.S. Department of Commerce, Special Publication 800-145, Sep. 2011, 7 pages.

Nilim et al., "Robust Control of Markov Decision Processes with Uncertain Transition Matrices", Operations Research, vol. 53, No. 5, Sep.-Oct. 2005, © 2005 Informs, 19 pages.

Petsagkourakis et al., "Reinforcement Learning for Batch Bioprocess Optimization", arXiv:1904.07292v2 [math.OC] Sep. 27, 2019, 29 pages.

Runge et al., "Learning to Design RNA", Published as a conference paper at ICLR 2019, arXiv;1812.11951v2 [cs.LG] Apr. 12, 2019, 29 pages.

Song et al., "Optimal Electricity Supply Bidding by Markov Decision Process", IEEE Transactions on Power Systems, vol. 15, No. 2, May 2000, 7 pages.

Zhou, Nianjun, "Regression-optimization Framework for Sequential Decision-making", Grace Period Disclosure, Informs Annual Meeting, Oct. 24, 2021 Anaheim, California, 15 pages.

\* cited by examiner

AUTOMATED MODEL PREDICTIVE CONTROL USING A REGRESSION-OPTIMIZATION FRAMEWORK FOR SEQUENTIAL DECISION MAKING

STATEMENT REGARDING PRIOR DISCLOSURES BY THE INVENTOR OR A JOINT INVENTOR

The following disclosure is submitted under 35 U.S.C. 102(b)(1)(A): DISCLOSURE: Regression-Optimization Framework for Sequential Decision Making, Informs Annual Meeting, 2021 Anaheim, California (Oct. 24-27, 2021)

BACKGROUND

The present invention relates generally to automated model predictive control, and more particularly to a regression-optimization framework for sequential decision making.

Data-driven control of processes, in the presence of process dynamics and non-linearity is commonly encountered in manufacturing and processing industries such as cement, steel, oil and gas, chemicals, etc. Given temporal data on the states of a continuous process, the actions taken, and the resulting "reward", a dynamic policy, i.e., a policy that encodes optimal actions to take in each process state, which addresses process state dynamics over a look-ahead horizon, is computed. Due to the process dynamics and nonlinearity, creating feasible temporal set point trajectories over a look-ahead horizon to maintain process stability and increase efficiency and throughput is challenging.

Model predictive control (MPC) needs a first principles system model, which it usually simplifies with local linearization. Approximate dynamic programming (ADP), Markov decision process (MDP), and reinforcement learning (RL) techniques have limited ability to consume complex constraints in data-driven control of process dynamics.

SUMMARY

In one aspect, a computer-implemented method for automated model predictive control is provided. The computer-implemented method includes training multiple step look-ahead regression models, using multiple step look-back historical states and look-back historical actions for a to-be-optimized system, for each timestep over a time horizon. The computer-implemented method further includes generating optimization constraints for each timestep of a future time horizon. The computer-implemented method further includes generating optimization variables, based on the multiple step look-ahead regression models using tuned look-back windows for each action and state, for each timestep of the future time horizon. The computer-implemented method further includes constructing an optimization model, the optimization model including an objective function, the optimization constraints, and the optimization variables. The computer-implemented method further includes solving the optimization model to produce actions for the to-be-optimized system, over the future time horizon. The computer-implemented method further includes recommending a subset of actions as commitment-look-ahead actions. The computer-implemented method further includes dynamically iterating over the horizon of interest by solving the optimization model at each time step, using a rolling horizon procedure, a special case of which is a rolling horizon approach over a fixed total look-ahead horizon of interest.

In another aspect, a computer program product for automated model predictive control is provided. The computer program product comprises a computer readable storage medium having program instructions embodied therewith, and the program instructions are executable by one or more processors. The program instructions are executable to: train multiple step look-ahead regression models, using multiple step look-back historical states and look-back historical actions for a to-be-optimized system, for each timestep over a time horizon; generate optimization constraints for each timestep of a future time horizon; generate optimization variables, based on the multiple step look-ahead regression models using tuned look-back windows for each action and state, for each timestep of the future time horizon; construct an optimization model, the optimization model including an objective function, the optimization constraints, and the optimization variables; solve the optimization model to produce actions for the to-be-optimized system, over the future time horizon; recommend a subset of actions as commitment-look-ahead actions; and dynamically iterate over the horizon of interest by solving the optimization model at each time step, using a rolling horizon procedure, a special case of which is a rolling horizon approach over a fixed total look-ahead horizon of interest.

In yet another aspect, a computer system for automated model predictive control is provided. The computer system comprises one or more processors, one or more computer readable tangible storage devices, and program instructions stored on at least one of the one or more computer readable tangible storage devices for execution by at least one of the one or more processors. The program instructions are executable to train multiple step look-ahead regression models, using multiple step look-back historical states and look-back historical actions for a to-be-optimized system, for each timestep over a time horizon. The program instructions are further executable to generate optimization constraints for each timestep of a future time horizon. The program instructions are further executable to generate optimization variables, based on the multiple step look-ahead regression models using tuned look-back windows for each action and state, for each timestep of the future time horizon. The program instructions are further executable to construct an optimization model, the optimization model including an objective function, the optimization constraints, and the optimization variables. The program instructions are further executable to solve the optimization model to produce actions for the to-be-optimized system, over the future time horizon. The program instructions are further executable to recommend a subset of actions as commitment-look-ahead actions. The program instructions are further executable to dynamically iterate over the horizon of interest by solving the optimization model at each time step, using a rolling horizon procedure, a special case of which is a rolling horizon approach over a fixed total look-ahead horizon of interest.

DETAILED DESCRIPTION

Embodiments of the present invention propose automated model predictive control using dynamic regression-optimization. Dynamic regression-optimization is optimizing control action for a continuous process and it uses integer-linearizable regression models. Dynamic regression-optimization has the following features. (1) Inputs are provided on the values of the states and features at each time step. (2) Under a higher-order Markovian assumption, integer-linearizable regression models represent transitions between system states. Process dynamics and nonlinearities are learned based on state transitions observed historically, given a certain action vector. (3) In a rolling horizon or receding horizon procedure, a hyperparameter called "commitment-look-ahead" is proposed to capture the number of time periods into the future that may use the recommendations from the optimization model that is iteratively repeatedly solved after each commitment-look-ahead step. (4) A simulator or a real live system is assumed to provide feedback on the system state (and objective function) given the recommended actions. This is to be used as the real initial state for the next optimization iteration. (5) The regression models are trained using historical states and actions. The lookback window for each historical state and action is determined based on regression model performance and knowledge of operations. This lookback window can further be tuned based on the evaluation of performance of the resulting model predictive controller that uses the dynamic regression models as proposed in this invention. In other words, the tuning of the look-back windows for dynamic regression models could use regression performance evaluation, as well as the resulting model predictive controller performance evaluation from the optimization recommendation. (6) The optimization model connects together regression models for every controllable and uncontrollable state variable, as well as for the optimization objective (such as reward, risk, cost, etc) that may be used in the objective function. (7) Generalized linear constraints involve one or multiple variables over a single time period or time horizon.

Figure 1:
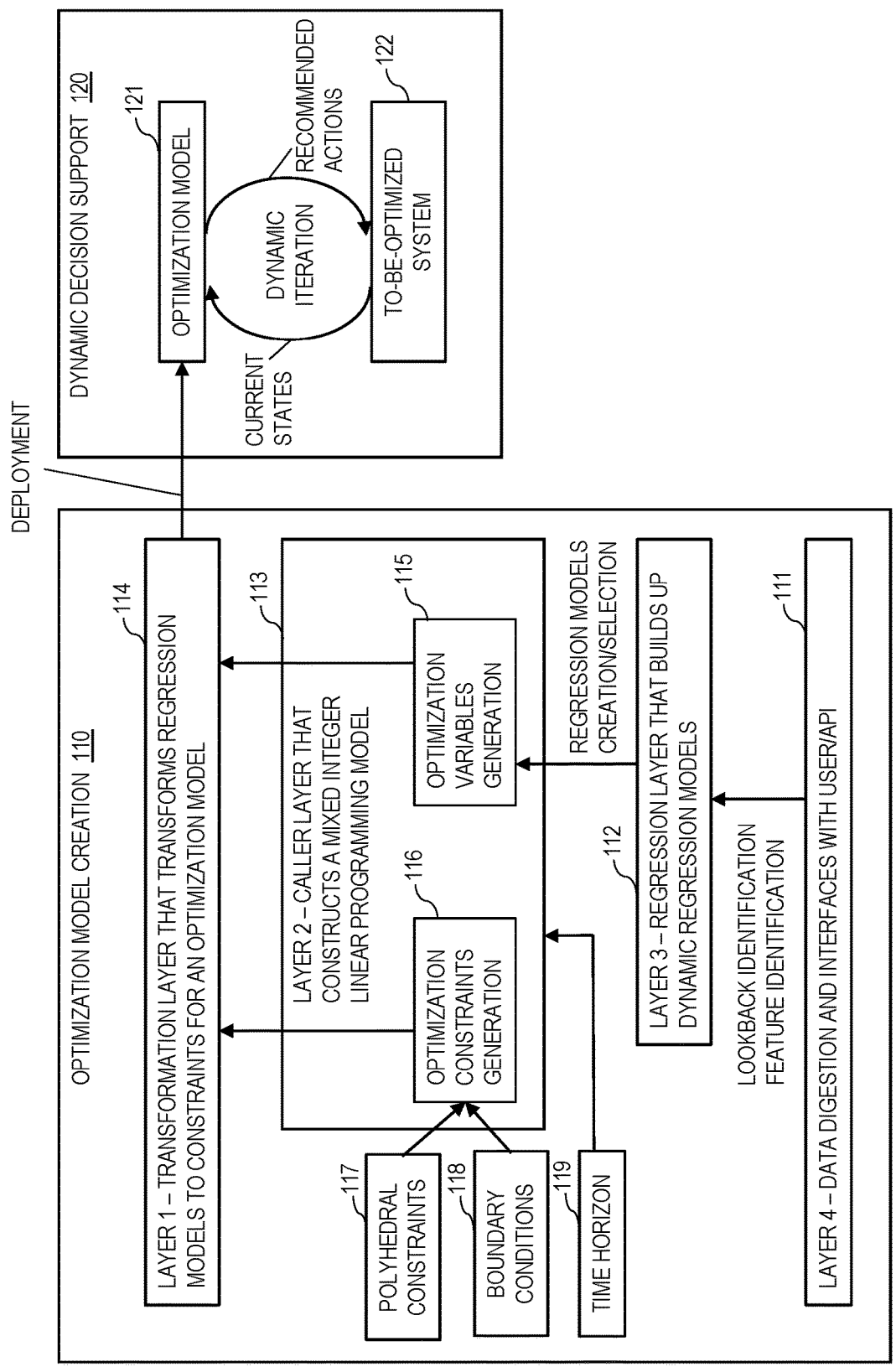
FIG. 1 is a systematic diagram illustrating a framework of automated model predictive control, in accordance with one embodiment of the present invention.

FIG. 1 is a systematic diagram illustrating a framework of automated model predictive control, in accordance with one embodiment of the present invention. The framework of automated model predictive control includes optimization model creation 110. Optimization model creation 110 includes four layers: layer 4 111—a data digestion and interfaces with user/API (Application Programming Interface); layer 3 112—a regression layer that builds up dynamic regression models; layer 2 113—a caller layer that constructs a mixed integer linear programming model; and layer 1 114—a transformation layer that transforms regression models and constraints for time-stamp specific regression models and constraints for an optimization model.

Referring to FIG. 1, one outcome of layer 4 111 is lookback identification. Lookback identification is a procedure to identify length of history of a particular state or action that is needed for sequential process optimization. The lookback is a hyperparameter of overall regression-optimization formulation. In one embodiment, this captures the inherent lag in the system that impacts the time taken for a change in one of the controllable or uncontrollable variables to affect the output variable. For example, in order to predict a value in a given time slot, how many steps we need to look back to include into the regression models. Another outcome of layer 4 111 is feature identification. Feature identification is a procedure to decide which features are included into the regression models.

Referring to FIG. 1, after regression models are created in layer 3 112, regression models are selected for optimization variable generation 115 in layer 2 113. Polyhedral constraints 117 and boundary conditions 118 are inputs for optimization constraints generation 116 in layer 2 113. In addition, time horizon 119 is an input for layer 2 113.

Referring to FIG. 1, layer 1 114 is a kernel of automatic translation from regression models to inequalities/equations for the optimization model. The optimization model, including an objective function, the optimization constraints, and the optimization variables over a look-ahead horizon, is deployed to dynamic decision support 120.

Referring to FIG. 1, dynamic decision support 120 includes optimization model 121. Optimization model 121 is solved to generate recommended actions for to-be-optimized system 122. The recommended actions are taken on the to-be-optimized system 122, and the resulting current states of the to-be-optimized system 122 are used as initial conditions for dynamic iterations of solving optimization model 121.

The framework of automated model predictive control is implemented on one or more servers. A server is described in more detail in later paragraphs with reference to FIG. 5. The framework of automated model predictive control may be implemented in a cloud computing environment. The cloud computing environment is described in more detail in later paragraphs with reference to FIG. 6 and FIG. 7.

In the framework of automated model predictive control, one or more servers compute a dynamic plan over a look-ahead horizon that addresses state dynamics, given temporal data on the states of continuous process, actions taken, and the resulting "reward".

In the framework of automated model predictive control, input data includes dataframe or matrix with (s,a,r) columns with time-indexed order on sequential rows (t=0, 1, . . . ), where s is a controllable state or an uncontrollable state, a is an action, and r is a reward. For a general problem of dynamic regression-optimization, for each time-stamp t=0, 1, . . . , there are m controllable state variables ($S_c$), n uncontrollable state variables ($S_{uc}$), P action/controls (A), and a scalar reward (r). The notations of the m controllable state variables, the n uncontrollable state variables, p action/controls, and a scalar reward at different times (t=0, 1, . . . ) are as follows:

$$\left\{\begin{array}{l} S_c = (s_{c,1}, s_{c,2}, s_{c,3}, \ldots, s_{c,m})_{controllable} \\ S_{uc} = (s_{uc,1}, s_{uc,2}, s_{uc,3}, \ldots, s_{uc,n})_{uncontrollable} \\ A = (a_1, a_2, \ldots, a_p)_{actions} \\ r \end{array}\right\}_{t=0,1,\ldots}$$

In the framework of automated model predictive control, input data further includes annotation for uncontrollable/external-randomness, for example, columns like market information, price, demand, etc. Input data further includes, for discrete or continuous actions and states, lower and upper bounds on each action and state for each timestep. Input data further includes generalized linear constraints involving one or multiple variables over a single time period or time horizon. Input data further includes an objective function.

In the framework of automated model predictive control, one or more servers builds up dynamic regression models. The dynamic regression models are as follows $$s_{c,i,t} = f_{c,i}(S_{c,[t-1,t-2,\ldots,t-k]}, S_{uc,t-1}, A_{t-1}), \forall i \in S_c$$

$$s_{uc,i,t} = f_{cu,i}(S_{uc,t-1}), \forall j \in S_{uc}$$

$$r_t = f_r(S_{c,[t,t-1,t-2,\ldots,t-k]}, S_{uc,[t,t-1,\ldots]}, A_{[t,t-1,t-2,\ldots]})$$

The regression models are built for one-step state transitions and reward. This is a supervised learning problem, so it is essentially identical to what has been already done in steady-state regression-optimization for flow optimization. The three types of the above regression equations are multiple step look-ahead regression models over a time horizon. The regression equations are expressions of the relationships between independent and dependent variables.

Automated machine learning (such as IBM AutoAI) is used for regression modeling. For each of the three types of regression equations, the framework of automated model predictive control trains the following models, such as linear regression, multivariate adaptive regression splines (MARS), decision trees, multi-layer perceptrons (MLP) with rectified linear unit (ReLU) activation function, P-RELU (Parametric Rectified Linear Unit), and random forest. One of trained models with the best predictive performance will be chosen; the performance is measured by, for example, R-squared ($R^2$), mean squared error (RMSE), and mean absolute error (MAE).

In the framework of automated model predictive control, one or more servers construct an optimization model. Optimization modeling poses a mathematical program over a finite horizon, T, to determine an optimal dynamic plan. The optimization model includes mixed integer linear state and reward equations as follows:

$$\max \sum_{t=0}^{T} \gamma^t r_t$$

$$r_t = f_r(S_{c,t}, S_{uc,t}, A_t), \forall t \in 0, 1, \ldots, T$$

$$s_{c,i,t} = f_{c,i}(S_{c,t-1}, S_{uc,t-1}, A_{t-1}), \forall t \in 1, 2, \ldots, T, \forall i \in S_c$$

$$s_{uc,i,t} = f_{cu,i}(S_{uc,t-1}), \forall t \in 1, 2, \ldots, T, \forall j \in S_{uc}$$

where $\gamma$ is a discount factor for geometric discounting of the time, T as a look-ahead horizon. The above is a chained sequence of such equations.

The optimization model further includes integer linear inequalities and/or equalities as follows:
initial conditions: $s_{c,i,0} = s_{ci0}$, $s_{uc,i,0} = s_{ci0}$, $\forall i \in S_c$, $\forall j \in S_{uc}$
smoothness: can be handled
other constraints: $A_t \in $ polyhedral$(S_{c,t}, S_{uc,t}, A_t)$, $\forall t \in 1, \ldots, T$
other boundaries: lower and upper on each of $A_t, S_{c,t}, S_{uc,t}$, $\forall t \in 1, \ldots, T$ The optimization model is solved by using an optimization software package such as IBM ILOG CPLEX Optimization Studio. Solving the optimization model produces a dynamic plan $(A_1, A_2, \ldots, A_T)$. When the optimization model is deployed, $A_1$ or $(A_1, A_2, \ldots, A_\Delta)$ is recommended, and then the above formulation is repeated using new initial conditions received from the to-be-optimized system in response to actions given in a previous iterative decision process. Here, $\Delta$ is "commitment-look-ahead" parameter, a special case is $\Delta=1$.

Figure 2:
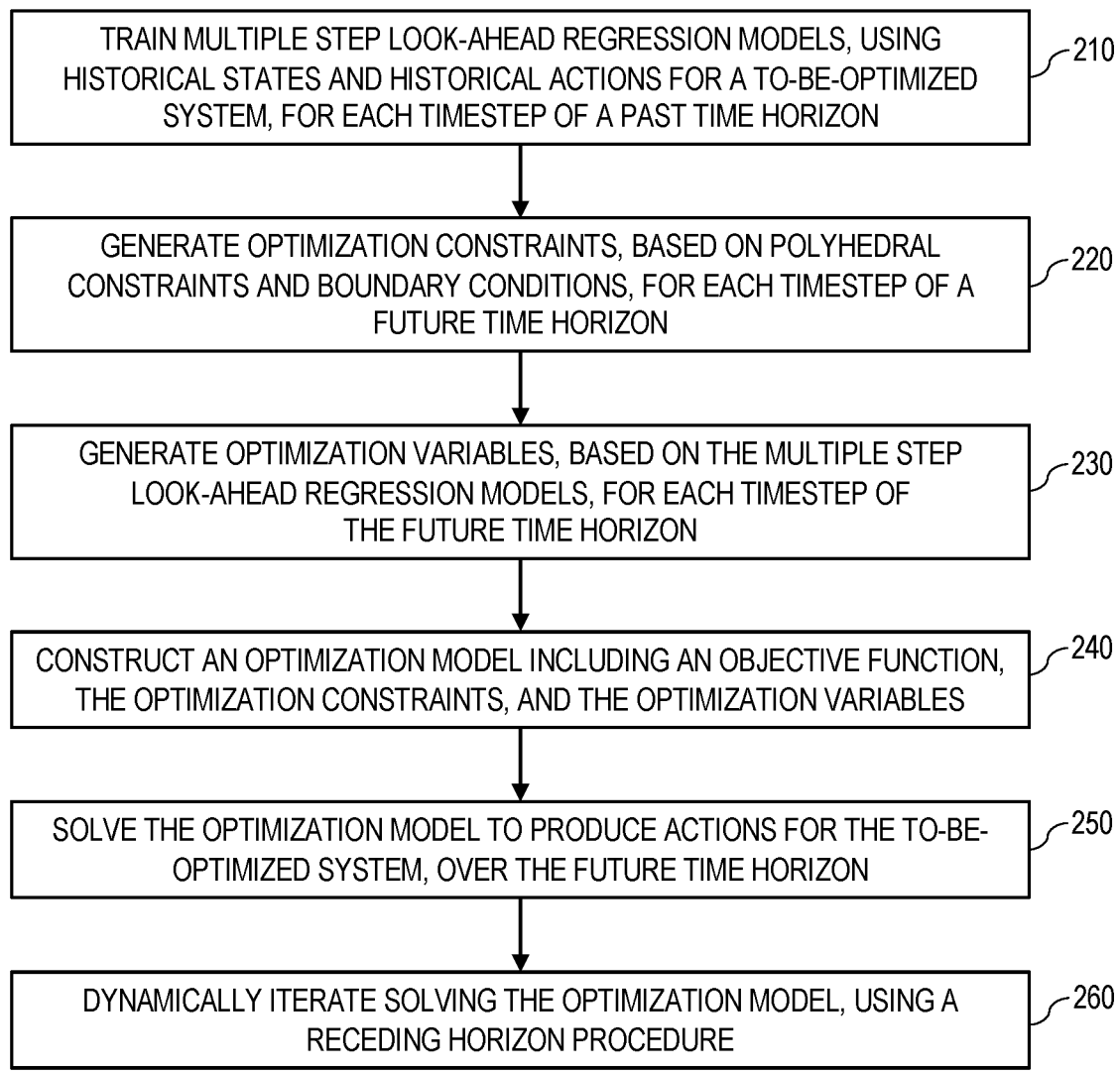
FIG. 2 is a flowchart showing operational steps of automated model predictive control, in accordance with one embodiment of the present invention.

FIG. 2 is a flowchart showing operational steps of automated model predictive control, in accordance with one embodiment of the present invention. The operational steps are implemented by the framework of automated model predictive control (shown in FIG. 1) which is hosted by one or more servers.

At step 210, the one or more servers train multiple step look-ahead regression models, using historical states and historical actions for a to-be-optimized system, for each timestep of a past time horizon. At step 220, the one or more servers generate optimization constraints, based on polyhedral constraints and boundary conditions, for each timestep of a future time horizon. At step 230, the one or more servers generate optimization variables, based on the multiple step look-ahead regression models, for each timestep of the future time horizon. At step 240, the one or more servers construct an optimization model including an objective function, the optimization constraints, and the optimization variables. At step 250, the one or more servers solve the optimization model to produce actions for the to-be-optimized system, over the future time horizon. At step 260, the one or more servers dynamically iterate solving the optimization model, using a receding/rolling horizon procedure. The receding/rolling horizon procedure is discussed in detail in later paragraphs with reference to FIG. 3.

Figure 3:
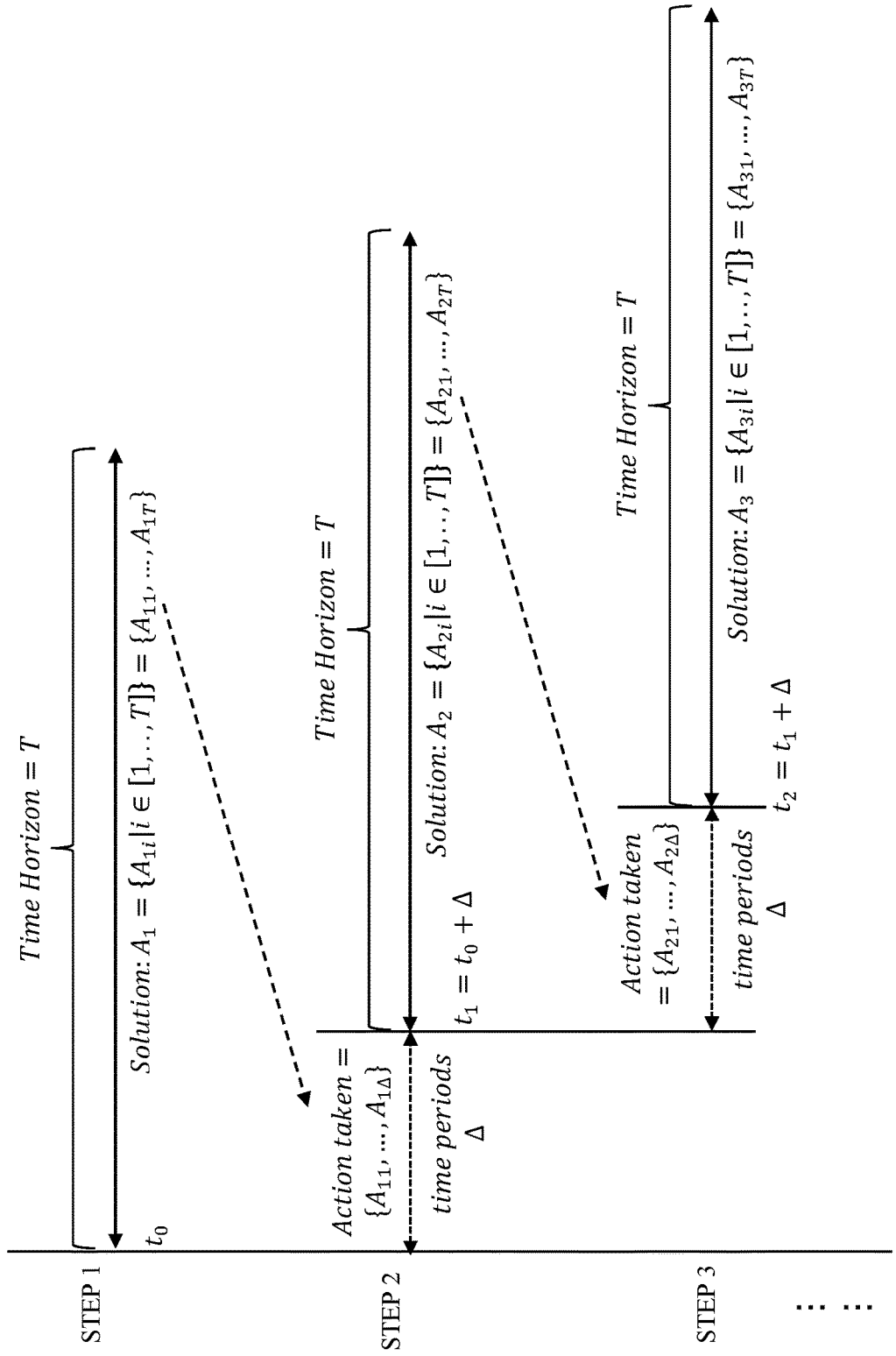
FIG. 3 is a diagram illustrating using a receding/rolling horizon procedure to dynamically iterate solving an optimization model, in accordance with one embodiment of the present invention.

FIG. 3 is a diagram illustrating using a receding/rolling horizon procedure to dynamically iterate solving an optimization model, in accordance with one embodiment of the present invention. Using the receding/rolling horizon procedure, the one or more servers dynamically iterate solving the optimization model. At step 1, the optimization model is solved over a time horizon T starting from the initial time $t_0$, and a solution for the to-be-optimized system is obtained. The solution at step 1 is a dynamic plan of actions for time stamps of $t=1, \ldots T$: $A_1 = \{A_{1i} | i \in [1, \ldots, T]\} = \{A_{11}, \ldots, A_{1T}\}$.

Referring to FIG. 3, at step 2, a subset of $A_1$ is selected as actions taken in a predetermined time period $\Delta$; the subset include actions taken for time stamps of $t=1, \ldots \Delta$: $\{A_{11}, \ldots, A_{1\Delta}\}$. The actions taken are applied to the to-be-optimized system from $t_0$ to $t_1 = t_0 + \Delta$ and then the current states will be used as initial conditions for solving optimization model at step 2. Thus, the optimization model is solved over a time horizon T starting from the initial time $t_1 = t_0 + \Delta$. A solution over a time horizon T starting from the initial time $t_1$ is obtained, and the solution at step 2 is a dynamic plan of actions for time stamps of $t=1, \ldots T$: $A_2 = \{A_{2i} | i \in [1, \ldots, T]\} = \{A_{21}, \ldots, A_{2T}\}$.

Further referring to FIG. 3, at step 3, a subset of $A_2$ is selected as actions taken in another predetermined time period $\Delta$, from $t_1$ to $t_2 = t_1 + \Delta$. The subset include actions taken for time stamps of t=1, . . . Δ: $\{A_{21}, \ldots, A_{2\Delta}\}$. The actions taken are applied to the to-be-optimized system from $t_1$ to $t_2=t_1+\Delta$, and then the current states will be used as initial conditions solving optimization model at step 3. The optimization model is further solved over a time horizon T starting from the initial time $t_2=t_1+\Delta$. A solution over a time horizon T starting from the initial time $t_2$ is obtained, and the solution at step 3 is a dynamic plan of actions for time stamps of t=1, . . . T: $A_3=\{A_{3i} | i \in [1, \ldots, T]\}=\{A_{31}, \ldots, A_{3T}\}$. At a step after step 3, a subset of $A_3$ is selected as actions taken in another predetermined time period Δ which starts from $t_2$. The same procedures will repeated in steps after step 3.

In general, the receding/rolling horizon procedure involves multiple steps. In each one of the multiple steps, the optimization model is solved over a time horizon T. For each steps, the solution of the optimization model is a dynamic plan of actions A. A subset of the solution (commitment-look-ahead) obtained from a former step is selected as actions taken for a latter step and the actions taken is applied to the to-be-optimized system in a latter step; the subset of the solution is applied in a predetermined time period Δ. The predetermined time period Δ is part of the future time horizon T and starts from an initial time in the former step. Upon applying the actions taken, the current states will be used as initial conditions for solving the optimization model in the latter step over the time horizon T which starts from an end of the predetermined time period Δ.

Figure 4:
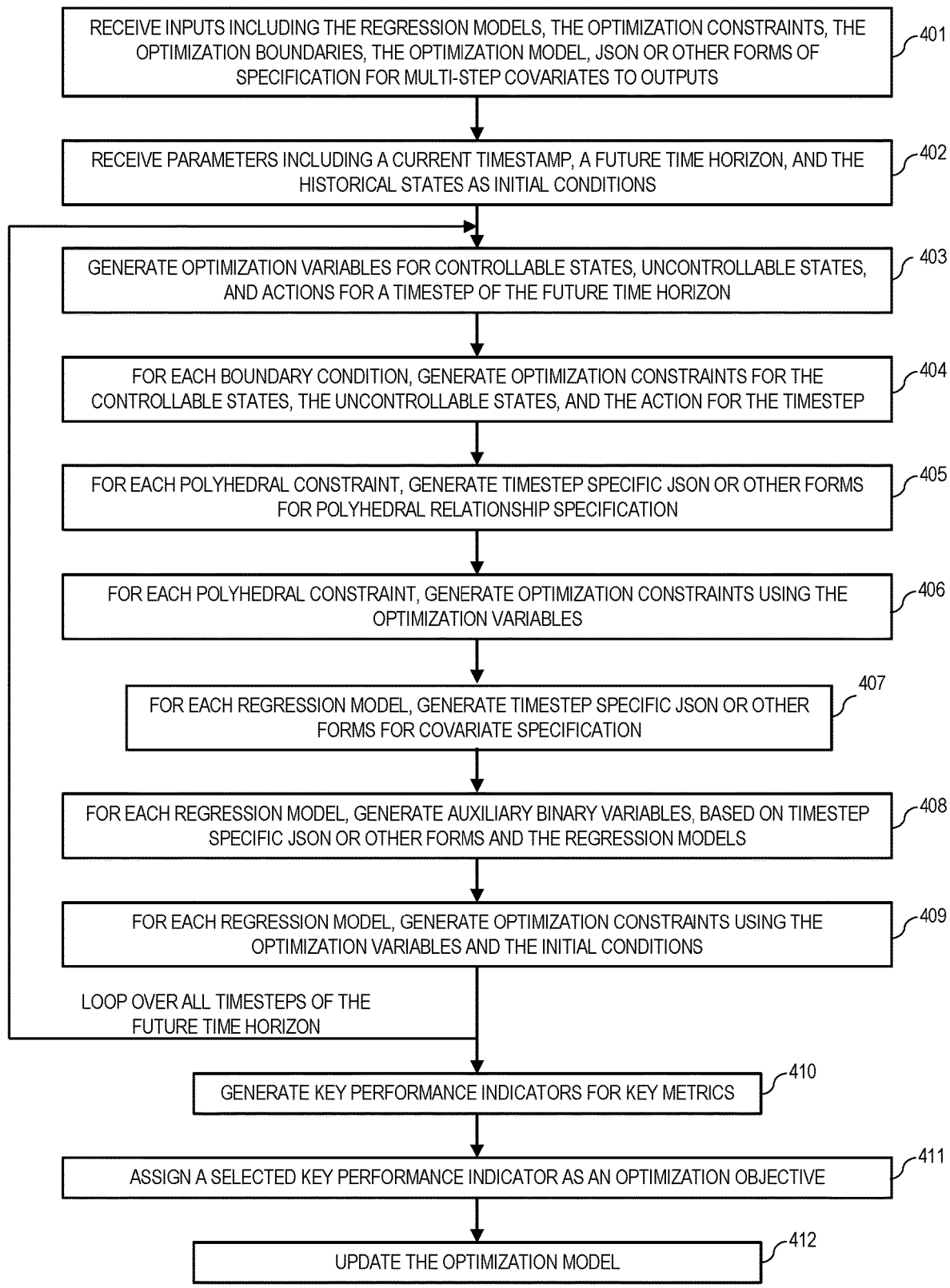
FIG. 4 is a flowchart showing operational steps of updating an optimization model, in accordance with one embodiment of the present invention.

FIG. 4 is a flowchart showing operational steps of updating the optimization model, in accordance with one embodiment of the present invention. The operational steps are implemented by the framework of automated model predictive control (shown in FIG. 1) which is hosted by one or more servers.

At step 401, the one or more servers receive inputs including the regression models, the optimization constraints, the optimization boundaries, the optimization model, JSON (JavaScript Object Notation) or other forms of specification for multi-step covariates to outputs. At step 402, the one or more servers receive parameters including a current timestamp, the future time horizon, and the historical states as initial conditions.

At step 403, the one or more servers generate optimization variables for controllable states, uncontrollable states, and actions for a timestep of the future time horizon. At step 404, the one or more servers, for each lower or upper boundary condition, generate optimization constraints for the controllable states, the uncontrollable states, and the action for the timestep. At step 405, the one or more servers, for each polyhedral constraint, generate timestep specific JSON or other forms for polyhedral relationship specification. At step 406, the one or more servers, for each polyhedral constraint, generate optimization constraints using the optimization variables. At step 407, the one or more servers, for each regression model, generate timestep specific JSON or other forms for covariate specification. At step 408, the one or more servers, for each regression model, generate auxiliary binary variables, based on timestep specific JSON or other forms and the regression models. At step 409, the one or more servers, for each regression model, generate optimization constraints using the optimization variables and the initial conditions. Steps 403-409 are implemented for each timestep of the future time horizon and iterated until steps 403-409 are completed for all timesteps of the future time horizon.

At step 410, the one or more servers generate key performance indicators (KPIs) for key metrics. At step 411, the one or more servers assign a selected key performance indicator as an optimization objective. At step 412, the one or more servers update the optimization model.

Figure 5:
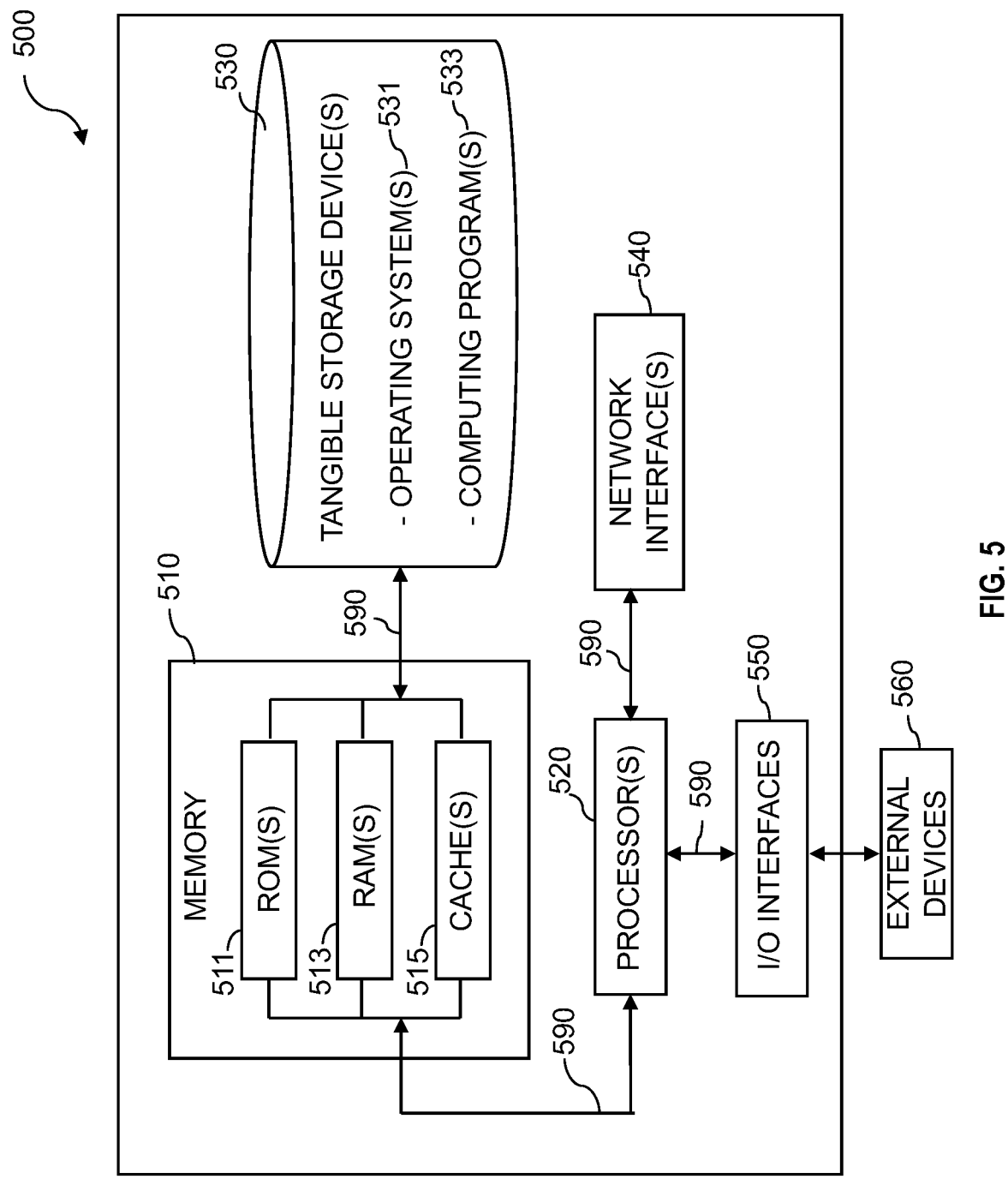
FIG. 5 is a diagram illustrating components of a computing device or server, in accordance with one embodiment of the present invention.

FIG. 5 is a diagram illustrating components of computing device or server 500, in accordance with one embodiment of the present invention. It should be appreciated that FIG. 5 provides only an illustration of one implementation and does not imply any limitations; different embodiments may be implemented.

Referring to FIG. 5, computing device or server 500 includes processor(s) 520, memory 510, and tangible storage device(s) 530. In FIG. 5, communications among the above-mentioned components of computing device or server 500 are denoted by numeral 590. Memory 510 includes ROM(s) (Read Only Memory) 511, RAM(s) (Random Access Memory) 513, and cache(s) 515. One or more operating systems 531 and one or more computer programs 533 reside on one or more computer readable tangible storage device(s) 530.

Computing device or server 500 further includes I/O interface(s) 550. I/O interface(s) 550 allows for input and output of data with external device(s) 560 that may be connected to computing device or server 500. Computing device or server 500 further includes network interface(s) 540 for communications between computing device or server 500 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
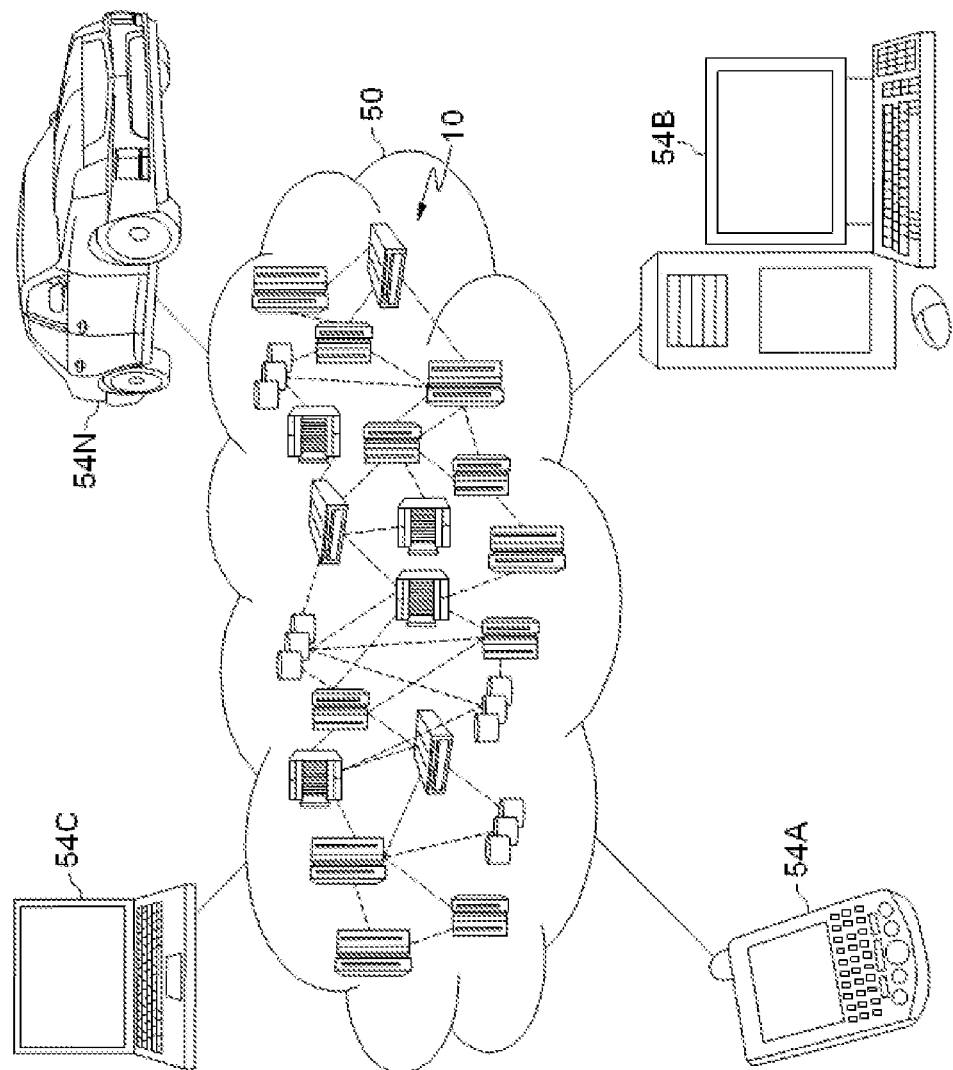
FIG. 6 depicts a cloud computing environment, in accordance with one embodiment of the present invention.

Referring now to FIG. 6, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 7:
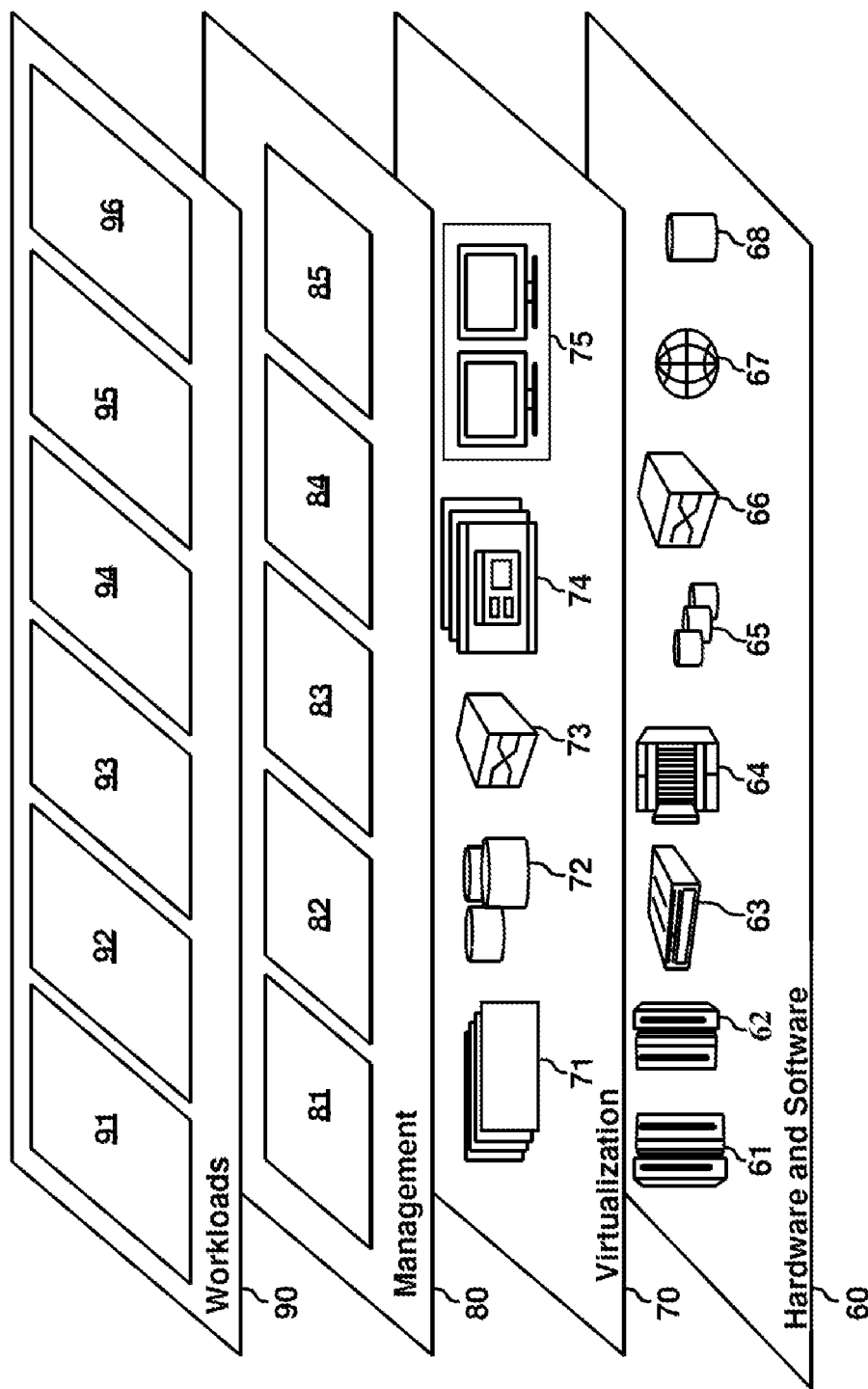
FIG. 7 depicts abstraction model layers in a cloud computing environment, in accordance with one embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of automated model predictive control using a regression-optimization framework for sequential decision making.

What is claimed is:

1. A computer-implemented method for automated model predictive control, the method comprising:
    training multiple step look-ahead regression models, using multiple step look-back historical states and look-back historical actions for a to-be-optimized system, for each timestep over a time horizon;
    generating optimization constraints for each timestep of a future time horizon;

generating optimization variables, based on the multiple step look-ahead regression models using tuned look-back windows for each action and state, for each timestep of the future time horizon;
constructing an optimization model, the optimization model including an objective function, the optimization constraints, and the optimization variables;
solving the optimization model to produce actions for the to-be-optimized system, over the future time horizon;
recommending a subset of actions as commitment-look-ahead actions; and
dynamically iterating over the horizon of interest by solving the optimization model at each time step, using a rolling horizon procedure, a special case of which is a rolling horizon approach over a fixed total look-ahead horizon of interest.

2. The computer-implemented method of claim 1, wherein the multiple step look-back historical states and look-back historical actions, the future time horizon, and a commitment-look-ahead horizon are hypermeters of the regression-optimization:
selecting one or more hyperparameters corresponding to a number of look-back historical states and look-back historical actions based on the integrated performance tuning of the regression model and the optimization performance of the objective, and/or other optimization KPIs over a simulator or a real live system; and
selecting the future time horizon, and commitment-look-ahead horizon based on the performance tuning of the optimization performance of the objective, and/or other optimization KPIs over a simulator or a real live system.

3. The computer-implemented method of claim 1, wherein the optimization constraints are generated based on polyhedral constraints and boundary conditions.

4. The computer-implemented method of claim 1, wherein the rolling horizon procedure including:
in multiple steps of iteration, for each step, obtaining a solution including the actions over the future time horizon;
selecting a subset of the actions in the solution obtained in a former step, actions in the subset being with time steps in a predetermined time period which is part of the future time horizon and starts from an initial time in the former step;
applying the actions in the subset to the predetermined time period;
using current states, upon applying the actions in the subset, as initial conditions for a following step; and
in the following step, solving the optimization model over the time horizon which starts from an end of the predetermined time period.

5. The computer-implemented method of claim 1, further comprising:
receiving inputs, the inputs including the multiple step look ahead regression models, the optimization constraints, optimization boundaries, the optimization model, JSON (JavaScript Object Notation) specification for multi-step covariates to outputs; and
receiving parameters, the parameters including a current timestamp, the future time horizon, and the historical states as initial conditions.

6. The computer-implemented method of claim 5, further comprising:
generating the optimization variables for controllable states, uncontrollable states, and actions for one timestep of the future time horizon;
for each lower or upper boundary condition, generating the optimization constraints for the controllable states, the uncontrollable states, and the action;
for each polyhedral constraint, generating timestep specific JSON for polyhedral relationship specification;
for each polyhedral constraint, generating the optimization constraints using the optimization variables;
for each regression model, generating timestep specific JSON for covariate specification;
for each regression model, generating auxiliary binary variables, based on timestep specific JSON and the regression models;
for each regression model, generating the optimization constraints using the optimization variables and the initial conditions; and
iterating steps for one timestep of the future time horizon, until the optimization variables and the optimization constraints are generated for all timesteps.

7. The computer-implemented method of claim 6, further comprising:
generating key performance indicators for key metrics;
assigning a selected key performance indicator as an optimization objective; and
updating the optimization model.

8. A computer program product for automated model predictive control, the computer program product comprising a computer readable storage medium having program instructions embodied therewith, the program instructions executable by one or more processors, the program instructions executable to:
train multiple step look-ahead regression models, using multiple step look-back historical states and look-back historical actions for a to-be-optimized system, for each timestep over a time horizon;
generate optimization constraints for each timestep of a future time horizon;
generate optimization variables, based on the multiple step look-ahead regression models using tuned look-back windows for each action and state, for each timestep of the future time horizon;
construct an optimization model, the optimization model including an objective function, the optimization constraints, and the optimization variables;
solve the optimization model to produce actions for the to-be-optimized system, over the future time horizon;
recommend a subset of actions as commitment-look-ahead actions; and
dynamically iterate over the horizon of interest by solving the optimization model at each time step, using a rolling horizon procedure, a special case of which is a rolling horizon approach over a fixed total look-ahead horizon of interest.

9. The computer program product of claim 8, wherein the multiple step look-back historical states and look-back historical actions, the future time horizon, and a commitment-look-ahead horizon are hypermeters of the regression-optimization:
selecting one or more hyperparameters corresponding to a number of look-back historical states and look-back historical actions based on the integrated performance tuning of the regression model and the optimization performance of the objective, and/or other optimization KPIs over a simulator or a real live system; and
selecting the future time horizon, and commitment-look-ahead horizon based on the performance tuning of the optimization performance of the objective, and/or other optimization KPIs over a simulator or a real live system.

10. The computer program product of claim 8, wherein the optimization constraints are generated based on polyhedral constraints and boundary conditions.

11. The computer program product of claim 8, further comprising the program instructions executable to:
in multiple steps of iteration, for each step, obtain a solution including the actions over the future time horizon;
select a subset of the actions in the solution obtained in a former step, actions in the subset being with time steps in a predetermined time period which is part of the future time horizon and starts from an initial time in the former step;
apply the actions in the subset to the predetermined time period;
use current states, upon applying the actions in the subset, as initial conditions for a following step; and
in the following step, solve the optimization model over the time horizon which starts from an end of the predetermined time period.

12. The computer program product of claim 11, further comprising the program instructions executable to:
receive inputs, the inputs including the multiple step look ahead regression models, the optimization constraints, optimization boundaries, the optimization model, JSON (JavaScript Object Notation) specification for multi-step covariates to outputs; and
receive parameters, the parameters including a current timestamp, the future time horizon, and the historical states as initial conditions.

13. The computer program product of claim 12, further comprising program instructions executable to:
generate the optimization variables for controllable states, uncontrollable states, and actions for one timestep of the future time horizon;
for each lower or upper boundary condition, generate the optimization constraints for the controllable states, the uncontrollable states, and the action;
for each polyhedral constraint, generate timestep specific JSON for polyhedral relationship specification;
for each polyhedral constraint, generate the optimization constraints using the optimization variables;
for each regression model, generate timestep specific JSON for covariate specification;
for each regression model, generate auxiliary binary variables, based on timestep specific JSON and the regression models;
for each regression model, generate the optimization constraints using the optimization variables and the initial conditions; and
iterate steps for one timestep of the future time horizon, until the optimization variables and the optimization constraints are generated for all timesteps.

14. The computer program product of claim 13, further comprising the program instructions executable to:
generate key performance indicators for key metrics;
assign a selected key performance indicator as an optimization objective; and
update the optimization model.

15. A computer system for automated model predictive control, the computer system comprising:
one or more processors, one or more computer readable tangible storage devices, and program instructions stored on at least one of the one or more computer readable tangible storage devices for execution by at least one of the one or more processors, the program instructions executable to:
train multiple step look-ahead regression models, using multiple step look-back historical states and look-back historical actions for a to-be-optimized system, for each timestep over a time horizon;
generate optimization constraints for each timestep of a future time horizon;
generate optimization variables, based on the multiple step look-ahead regression models using tuned look-back windows for each action and state, for each timestep of the future time horizon;
construct an optimization model, the optimization model including an objective function, the optimization constraints, and the optimization variables;
solve the optimization model to produce actions for the to-be-optimized system, over the future time horizon;
recommend a subset of actions as commitment-look-ahead actions; and
dynamically iterate over the horizon of interest by solving the optimization model at each time step, using a rolling horizon procedure, a special case of which is a rolling horizon approach over a fixed total look-ahead horizon of interest.

16. The computer system of claim 15, wherein the multiple step look-back historical states and look-back historical actions, the future time horizon, and a commitment-look-ahead horizon are hypermeters of the regression-optimization:
selecting one or more hyperparameters corresponding to a number of look-back historical states and look-back historical actions based on the integrated performance tuning of the regression model and the optimization performance of the objective, and/or other optimization KPIs over a simulator or a real live system; and
selecting the future time horizon, and commitment-look-ahead horizon based on the performance tuning of the optimization performance of the objective, and/or other optimization KPIs over a simulator or a real live system.

17. The computer system of claim 15, wherein the optimization constraints are generated based on polyhedral constraints and boundary conditions.

18. The computer system of claim 15, further comprising the program instructions executable to:
in multiple steps of iteration, for each step, obtain a solution including the actions over the future time horizon;
select a subset of the actions in the solution obtained in a former step, actions in the subset being with time steps in a predetermined time period which is part of the future time horizon and starts from an initial time in the former step;
apply the actions in the subset to the predetermined time period;
use current states, upon applying the actions in the subset, as initial conditions for a following step; and
in the following step, solve the optimization model over the time horizon which starts from an end of the predetermined time period.

19. The computer system of claim 18, further comprising the program instructions executable to:
receive inputs, the inputs including the multiple step look ahead regression models, the optimization constraints, optimization boundaries, the optimization model, JSON (JavaScript Object Notation) specification for multi-step covariates to outputs; and receive parameters, the parameters including a current timestamp, the future time horizon, and the historical states as initial conditions.

20. The computer system of claim 19, further comprising program instructions executable to:

generate the optimization variables for controllable states, uncontrollable states, and actions for one timestep of the future time horizon;

for each lower or upper boundary condition, generate the optimization constraints for the controllable states, the uncontrollable states, and the action;

for each polyhedral constraint, generate timestep specific JSON for polyhedral relationship specification;

for each polyhedral constraint, generate the optimization constraints using the optimization variables;

for each regression model, generate timestep specific JSON for covariate specification;

for each regression model, generate auxiliary binary variables, based on timestep specific JSON and the regression models;

for each regression model, generate the optimization constraints using the optimization variables and the initial conditions;

iterate steps for one timestep of the future time horizon, until the optimization variables and the optimization constraints are generated for all timesteps;

generate key performance indicators for key metrics;

assign a selected key performance indicator as an optimization objective; and update the optimization model.

* * * * *